United States Patent [19]

Etsion

[11] 4,099,799
[45] Jul. 11, 1978

[54] CANTILEVER MOUNTED RESILIENT PAD GAS BEARING

[76] Inventors: James C. Fletcher, Administrator of the National Aeronautics and Space Administration, with respect to an invention of Izhak Etsion, Haifa, Israel

[21] Appl. No.: 792,069

[22] Filed: Apr. 28, 1977

[51] Int. Cl.² .............................................. F16C 17/00
[52] U.S. Cl. ...................................... 308/5 R; 308/9; 308/121; 308/160; 308/163; 308/172; 308/DIG. 1
[58] Field of Search ..................... 308/9, 5 R, 3 R, 26, 308/160, 163, 164, 134.1, 168, 170, 172, 139, 135, 121, DIG. 1; 267/160

[56] References Cited

U.S. PATENT DOCUMENTS

| 3,384,425 | 5/1968 | Brown | 308/5 R |
|---|---|---|---|
| 3,677,612 | 7/1972 | Barnett et al. | 308/5 R |
| 3,971,602 | 7/1976 | Anderson | 308/160 |
| 3,998,499 | 12/1976 | Chiarotto | 308/3 R |
| 4,005,914 | 2/1977 | Newman | 308/DIG. 1 X |

*Primary Examiner*—Trygve M. Blix
*Assistant Examiner*—Douglas C. Butler
*Attorney, Agent, or Firm*—N. T. Musial; J. R. Manning; G. E. Shook

[57] ABSTRACT

A gas-lubricated bearing employing at least one pad mounted on a rectangular cantilever beam to produce a lubricating wedge between the face of the pad and a moving surface. The load-carrying and stiffness characteristics of the pad are related to the dimensions and modulus of elasticity of the beam. The bearing is applicable to a wide variety of types of hydrodynamic bearings.

4 Claims, 10 Drawing Figures

CANTILEVER MOUNTED RESILIENT PAD GAS BEARING

ORIGIN OF THE INVENTION

The invention described herein was made in the performance of work under a NASA contract and is subject to the provisions of Section 305 of the National Aeronautics and Space Act of 1958, Public Law 85-568 (72 Statue 435; 42 USC 2457).

BACKGROUND OF THE INVENTION

1. Field of the Invention

The present invention relates generally to bearings for rotating machinery, and more particularly to such bearings having resilient elements to develop a load-supporting gas film and provide controlled bearing characteristics.

2. Description of the Prior Art

Modern gas bearing applications require tolerance to dirt ingestion and high-temperature operating capability. The first requirement was met by the development of foil bearings and compliant surface or compliant mounted bearings. Foil bearings are less successful as thrust bearings than as journal bearings. Compliant-type bearings using elastomeric materials are temperature limited. A new type of bearing has recently been developed which combines compliance with high-temperature operating capability. This is a resilient pad gas thrust bearing that does not contain any elastomers in the bearing assembly and is disclosed in commonly assigned U.S. Pat. No. 3,971,602, which issued to William J. Anderson on July 27, 1976. This bearing still suffers from certain disadvantages among which are a range of appplication limited to annular rotating thrust bearings, and bearing characteristics such as load capacity and stiffness which are difficult to control.

BRIEF SUMMARY OF THE INVENTION

It is therefore one object of the present invention to provide an improved gas bearing.

It is another object of the present invention to provide an improved resilient pad gas bearing whose range of application is not limited to annular rotating thrust bearings.

It is a further object of the present invention to provide an improved resilient pad gas bearing having easily controllable bearing characteristics.

The objects of the present invention are achieved by a gas bearing including first and second elements movable relative to one another and positioned to form a spacing therebetween, and resilient bearing means disposed with the spacing for deflecting in response to a pressure distribution established by the relative movement of the first and second elements. The resilient bearing means includes a resilient cantilever beam rigidly mounted at one end to the first element, and a pad rigidly mounted along a line parallel to its trailing edge to the other end of the cantilever beam for receiving the load pressure of the bearing.

The foregoing as well as other objects, features and advantages of the present invention will become more apparent from the following detailed description taken in conjunction with the appended drawings.

DESCRIPTION OF THE PREFERRED EMBODIMENTS

Figure 1:
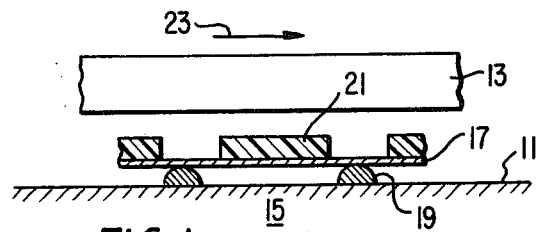
FIG. 1 is a partial sectional view through the gas thrust bearing of the prior art in a static position.

Referring to FIG. 1 of the drawings, there are illustrated diagrammtically a stationary element 11 and a corresponding movable element 13 of a bearing 15. These two elements are common to all bearings whether they be of the slider, thrust, journal or other type of bearing and the invention herein is applicable to all the various types of bearings. As examples, for bearings of the thrust type, the stationary element 11 is a supporting mount while the movable element 13 is a circular runner. For bearings of the journal type, the stationary element 11 is a supporting bushing while the movable element 13 is a rotatable shaft.

The objective of a gas bearing is to provide support of an element while allowing relative motion between the element and a fixed element and to prevent the elements from contacting each other or at least from coming into contact in such a fashion that there is failure of the system, i.e. relative motion becomes exceedingly difficult or impossible. As is the case in all gas bearings, there is a spacing between the movable and stationary elements where a sufficient pressure must exist if the two elements are to remain separated, and that pressure is created by a gas located between the two elements.

Figure 2:
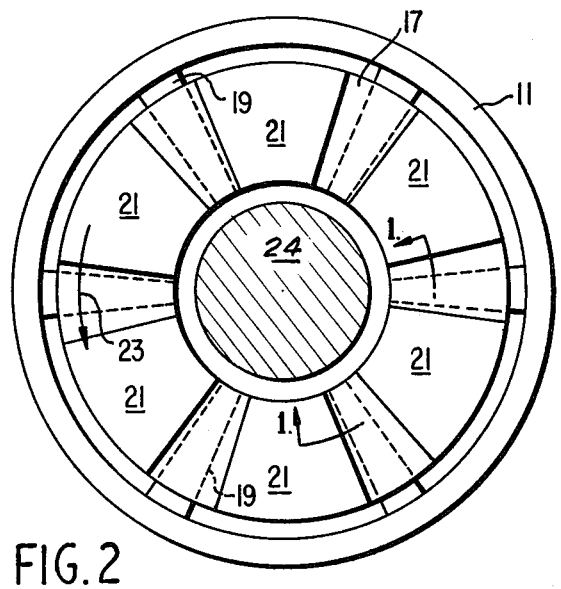
FIG. 2 is a cross-sectional view of the gas thrust bearing of the prior art.
Figure 3:
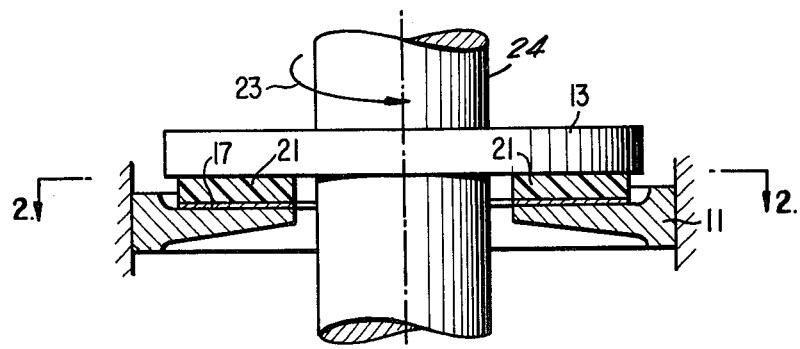
FIG. 3 is a longitudinal sectional view through the gas thrust bearing of the prior art.

In the prior art bearing of the above-mentioned patent, which is a bearing of the thrust type, a resilient bearing element, or beam 17, is placed in the spacing. A beam, as used in the specification, is defined as a relatively thin flexible bearing element or strip whose thickness relative to its other dimensions is such that it may be locally deflected by the gas film created between the stationary and movable elements of the bearing. As viewed in FIGS. 2 and 3, the bearing beam 17 takes the form of an annular metallic heat resistant (rather than elastomeric) member supported by a plurality of inwardly cantilevered, relatively rigid spokes 19, spaced circumferentially angularly equally. On the beam are mounted an equal plurality of rigid, sector-shaped pads 21 spaced equally circumferentially between the spokes 19, so that under load the pads yield due to the resilience of the beam. FIG. 1 shows a portion of the bearing of the above-mentioned patent having a pad 21 carried by the resilient beam 17 between a pair of spokes 19. The axial stiffness of the resilient beam 17 is a function of the beam dimensions between each set of spokes.

Figure 4:
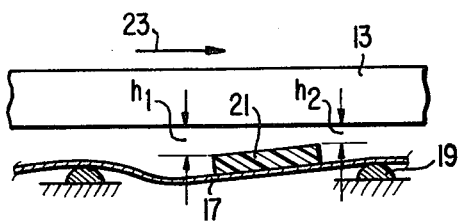
FIG. 4 is a partial sectional view through the gas thrust bearing of the prior art in an exaggerated dynamic position.

Referring to FIG. 4, in the prior art bearing as the runner 13 approaches speed in the rotation direction 23, the ambient gas, which may be air, is entrapped between the runner 13 and the pads 21. As the air is trapped between the pads 21 and the runner 13 the resilient beam is shaped somewhat as shown (but much exaggerated) and the pad 21 assumes a non-zero angle relative to a plane normal to the axis. The entrapped air creates the gas bearing, the pad assuming at its leading edge (the edge approached first by a part on the shaft 24) a spacing $h_1$ from the runner, and at its trailing edge (the edge approached circumferentially later by the same point on the shaft 24 as it continues to rotate) a spacing $h_2$. Under the conditions illustrated, the load capacity of the pad is maximized whenever the pad tilt results in a uniformly minimum gas film thickness along its trailing edge.

Figure 5:
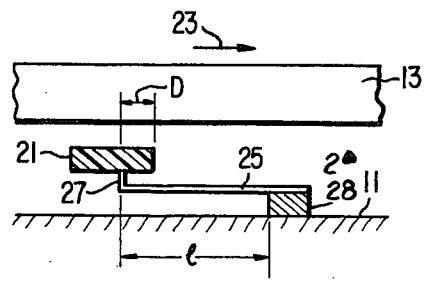
FIG. 5 is a partial sectional view useful in describing the operation of a bearing embodying the invention, in a static position.
Figure 6:
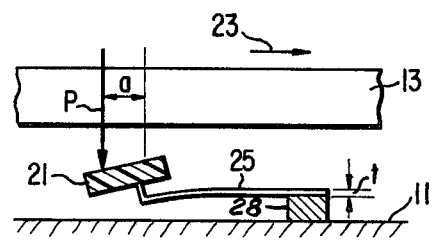
FIG. 6 is a partial sectional view useful in describing the operation of a bearing embodying the invention shown in exaggerated dynamic position.

FIG. 5 illustrates the principle of operation of the bearing of this invention. The symbols used in FIG. 1 are used to designate identical corresponding parts of the illustration. In this figure, the annular beam 17 of the prior art bearing of the above-mentioned patent is replaced by a rigidly mounted retangular cantilever beam 25, and the sector-shaped pad 21 is attached thereto along the line 27 parallel to the pad trailing edge and at a distance D from that edge. This line serves as a pivot about which the pad is tilted as the runner 13 approaches speed in the rotation direction 23. It can be shown that the radial pivot line which will maximize the load capacity of the bearing is its trailing edge. This is also true for any pivot line parallel to the trailing edge. Referring to FIG. 6 as the runner 13 approaches speed in the rotation direction 23, the ambient gas is trapped between the pad 21 and the runner 13, and the rectangular cantilever beam is shaped somewhat (but much exaggerated). The center of load pressure of the pad 21 is indicated by the arrow P. The pad assumes a non-zero angle relative to a plane normal to the axis, and the entrapped gas creates the gas bearing.

The bearing's characteristics depend on the amount of the pad's tilt about the line 27 and the deflection of the cantilever beam. These are functions of the beam's thickness $t$, width $b$, and length from the pivot line 27 to a fixed beam support 28 which is part of the stationary element as well as the distance $a$ between the point where the load is applied and the pivot line.

Figure 7:
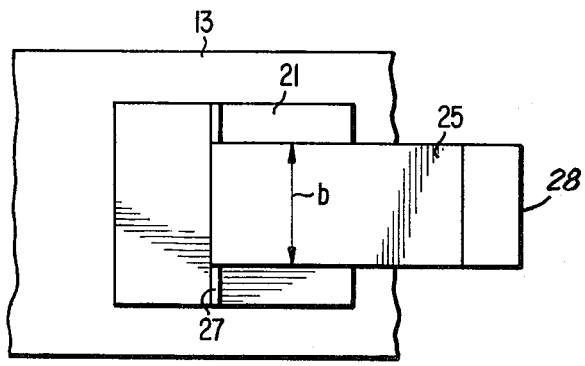
FIG. 7 is a plan view of one particular arrangement in accordance with the invention as embodied in a slider-type of bearing.

FIG. 7 shows a plan view of the inventive concept as it is arranged in a slider-type gas bearing which is the simplest configuration embodying the present invention. A rectangular pad 21 is rigidly mounted along the pivot line 27 on a cantilever resilient beam 25. This beam 25 is rigidly secured to a fixed beam support 28 at the edge opposite the pivot line 27. Because of this mounting a load acting on the pad 21 deflects the beam 25 and assures a converging film thickness in the direction of motion of the runner 13 as shown in FIG. 6. This converging clearance maintains the hydrodynamic lubricating film to support the load in linear motion.

Figure 8:
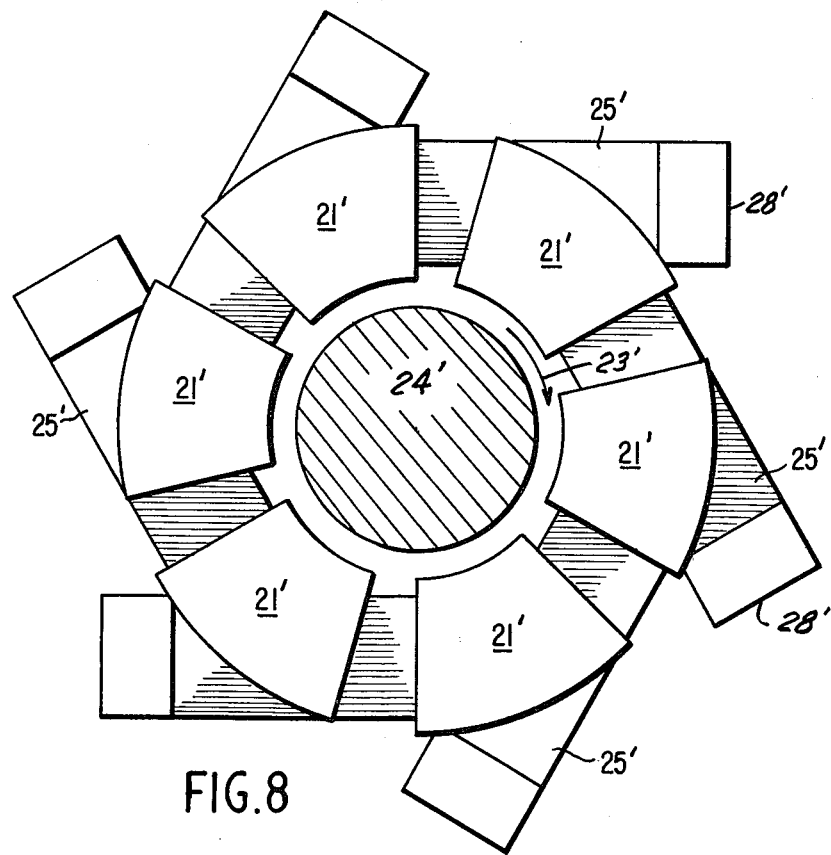
FIG. 8 is a top plan view of one particular arrangement in accordance with the invention as embodied in a thrust-type bearing.

FIG. 8 shows a plan view of the inventive concept as it is arranged in a thrust-type gas bearing wherein each of the pads 21' is mounted on a resilient cantilever beam 25' secured to a fixed beam support 28'. Each pad 21' has a sector shape and is used to support an axial or thrust load on a shaft 24'. Each sector shaped pad 21' is attached to the cantilever beam 25' along a line parallel to the pad trailing edge. This line is at the end opposite the support 28' and serves as a pivot about which the pad 21' is tilted as pointed out above in connection with FIG. 5. A load acting on each pad 21' at the center of pressure causes the deflection of the cantilever beam 25' as shown in FIG. 6. For a mathematical analysis and a discussion of the results achieved by the bearing of FIG. 8 and tabular results for various parameters, reference may be made to NASA Technical Note TN-D-88221 entitled "Analysis and Design of a Cantilever-Mounted Resilient-Pad Gas-Lubricated Thrust Bearing".

Figure 9:
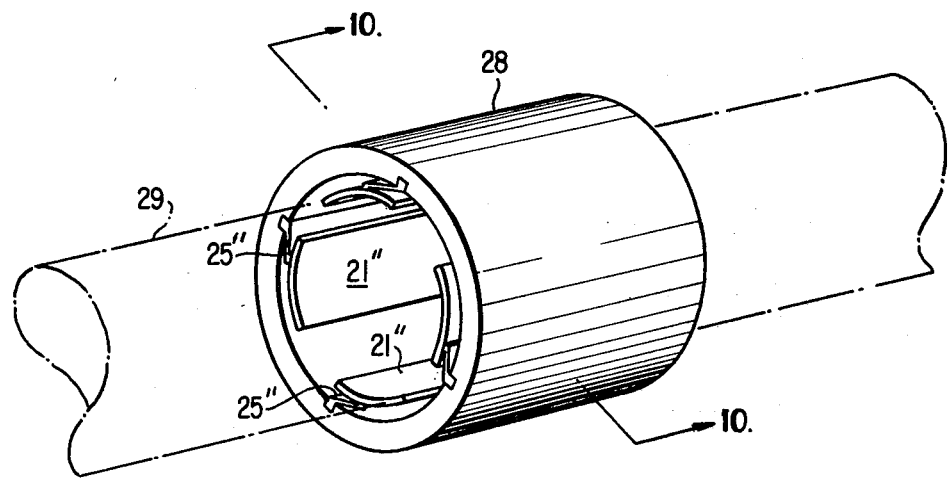
FIG. 9 is a perspective view of one particular arrangement in accordance with the invention as embodied in a journal-type of bearing.
Figure 10:
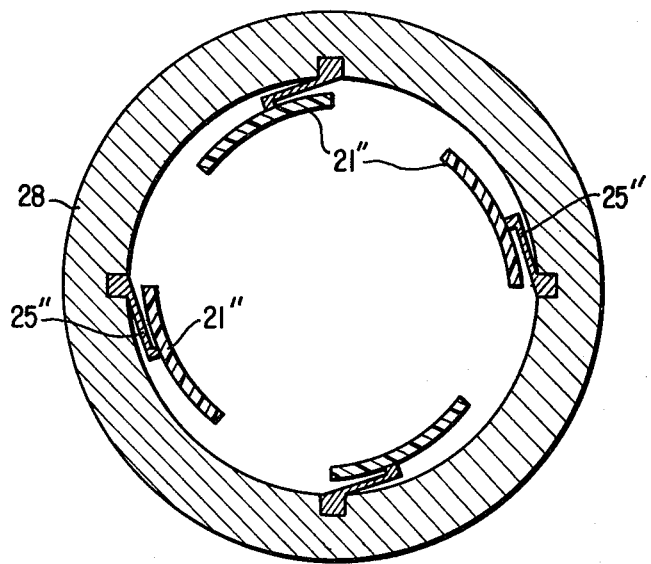
FIG. 10 is a sectional view of the arrangement shown in FIG. 9 taken along the line 10—10 and looking in the direction of the arrows.

FIGS. 9 and 10 illustrate the inventive concept as it is arranged in a journal-type bearing. In these figures, a journal-type bearing is shown comprising a stationary element such as a bushing 28 and a rotatable element such as a shaft 29. Affixed to the interior of the bushing 28 in the FIG. 9 embodiment are a number of resilient cantilever beams 25" and pads 21". These may be seen more clearly in FIG. 10 which is a sectional view taken along the line 10—10 of FIG. 9.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A gas bearing comprising;
   first and second elements movable relative to one another and positioned to form a spacing therebetween; and
   resilient bearing means disposed within the spacing for deflecting in response to a pressure distribution established by the relative movement of the first and second elements, the resilient bearing means including
   a resilient cantilever beam extending in the direction of said relative movement being rigidly mounted at one end to the first element; and
   a pad rigidly mounted along a line parallel to its trailing edge to the other end of the cantilever beam and having a substantially smooth surface facing said second element for receiving the load pressure of the bearing, said line being in a plane substantially perpendicular to the direction of said relative movement.

2. The gas bearing recited in claim 1 wherein: the bearing is of the slider type.

3. The gas bearing recited in claim 1 wherein: the bearing is of the thrust type;
   the first element comprises a stationary element; and
   the second element comprises an element rotatable relative to the stationary element.

4. The gas bearing being recited in claim 1 wherein: the bearing is of the journal type;
   the first element comprises a bushing having an opening; and
   the second element comprises a rotatable shaft received within the bushing.

* * * * *